April 10, 1934. E. W. MILLER 1,953,969
MACHINE AND METHOD FOR FORMING EXTERNALLY TOOTHED MACHINE ELEMENTS
Filed Sept. 17, 1929 11 Sheets-Sheet 1

Inventor
Edward W. Miller
by Wright, Brown, Quinby & May
Attys.

April 10, 1934. E. W. MILLER 1,953,969
MACHINE AND METHOD FOR FORMING EXTERNALLY TOOTHED MACHINE ELEMENTS
Filed Sept. 17, 1929 11 Sheets-Sheet 2

Inventor
Edward W. Miller

April 10, 1934.  E. W. MILLER  1,953,969
MACHINE AND METHOD FOR FORMING EXTERNALLY TOOTHED MACHINE ELEMENTS
Filed Sept. 17, 1929  11 Sheets-Sheet 4

Inventor:
Edward W. Miller
by Wright, Brown, Quinby & May
Attys.

April 10, 1934.  E. W. MILLER  1,953,969
MACHINE AND METHOD FOR FORMING EXTERNALLY TOOTHED MACHINE ELEMENTS
Filed Sept. 17, 1929  11 Sheets-Sheet 5

Inventor
Edward W. Miller
by Wright, Brown, Quinby & Heavy
Attys.

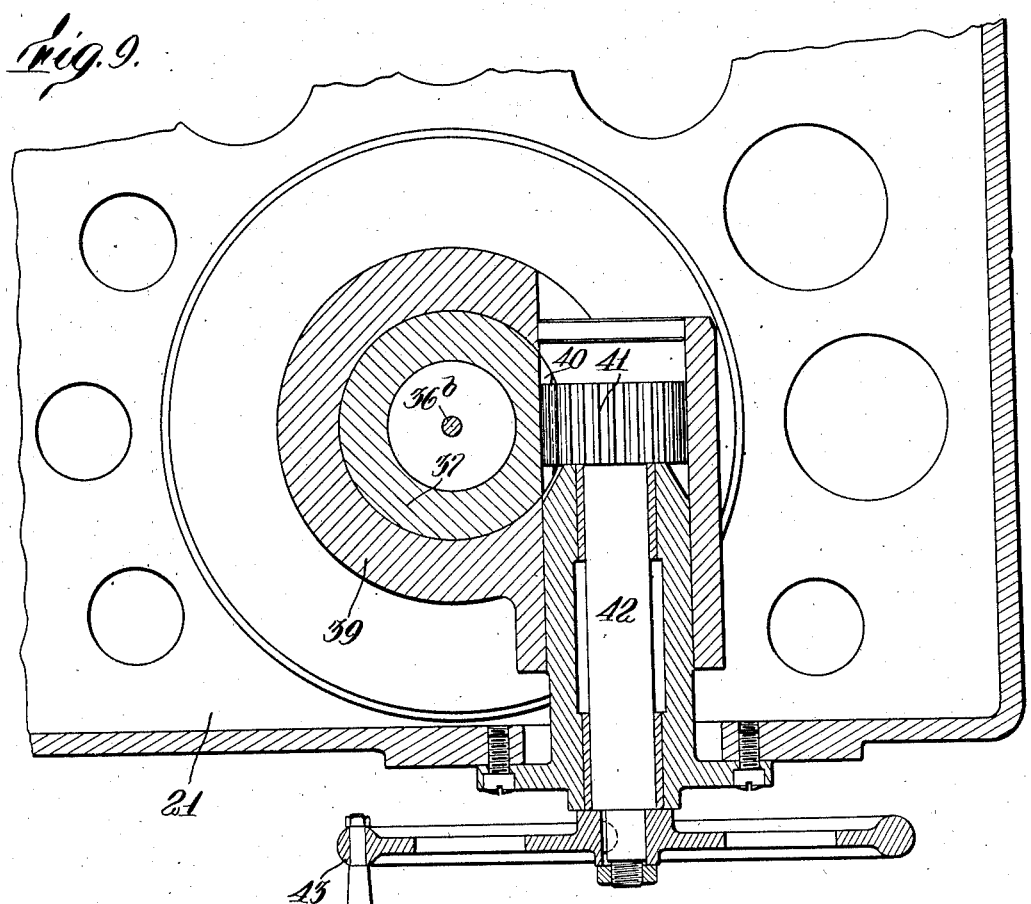
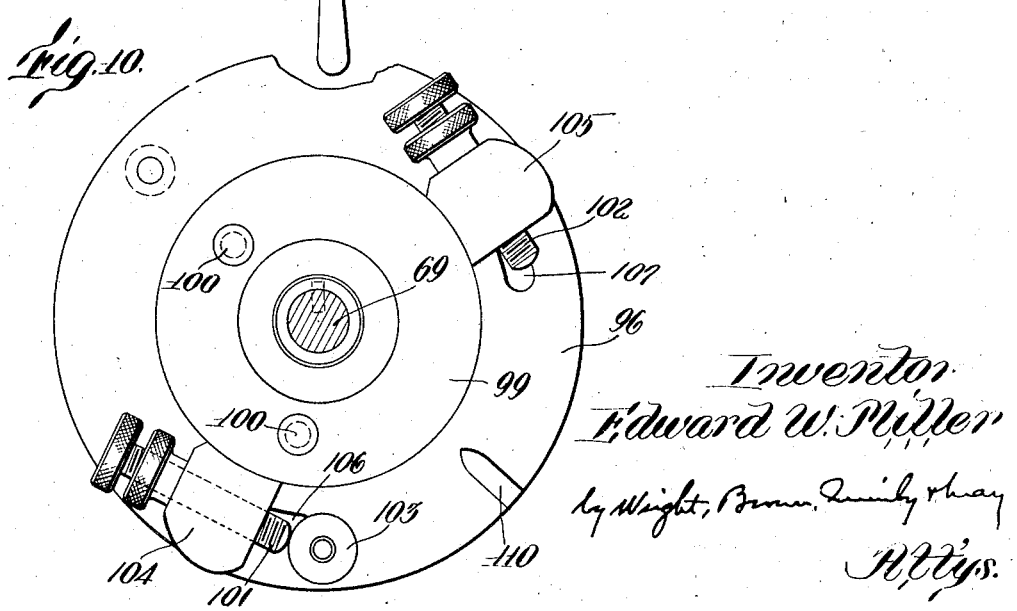

April 10, 1934.  E. W. MILLER  1,953,969
MACHINE AND METHOD FOR FORMING EXTERNALLY TOOTHED MACHINE ELEMENTS
Filed Sept. 17, 1929    11 Sheets-Sheet 7
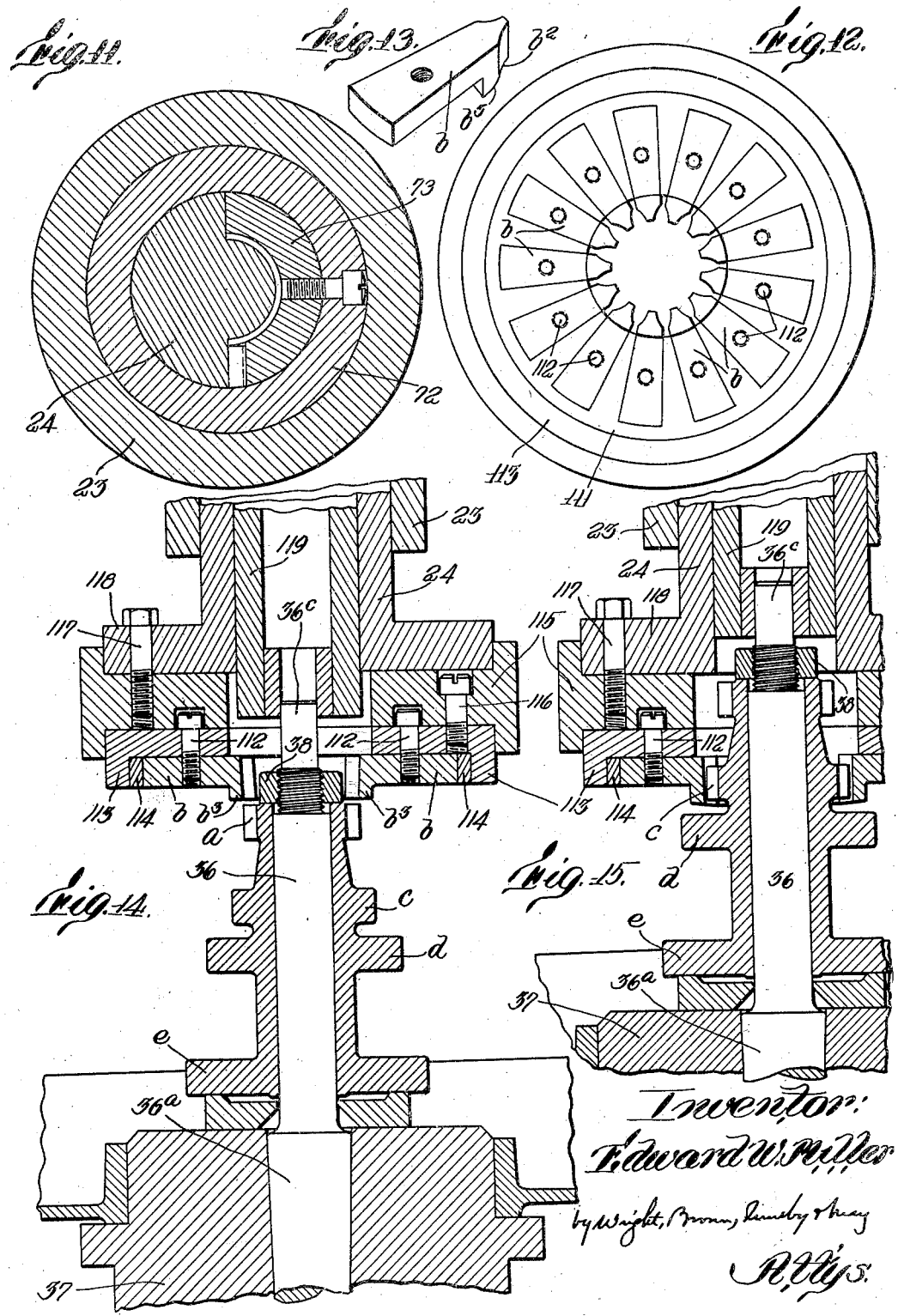

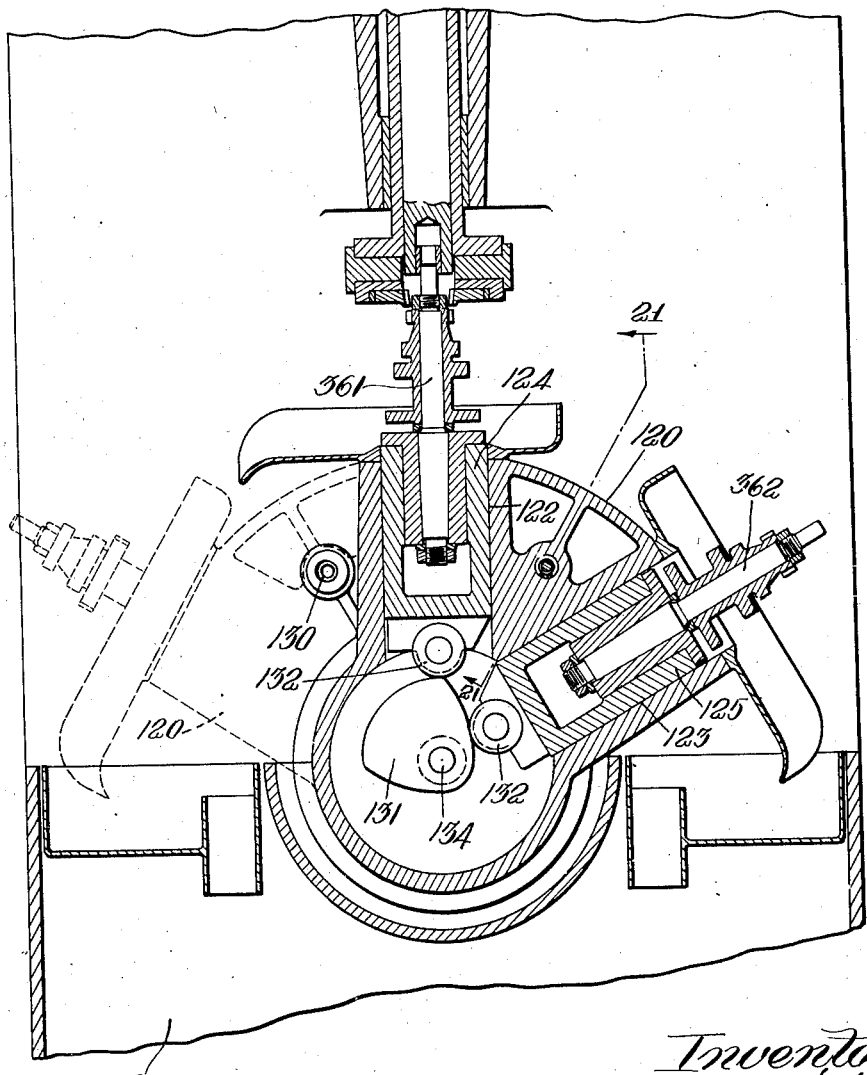

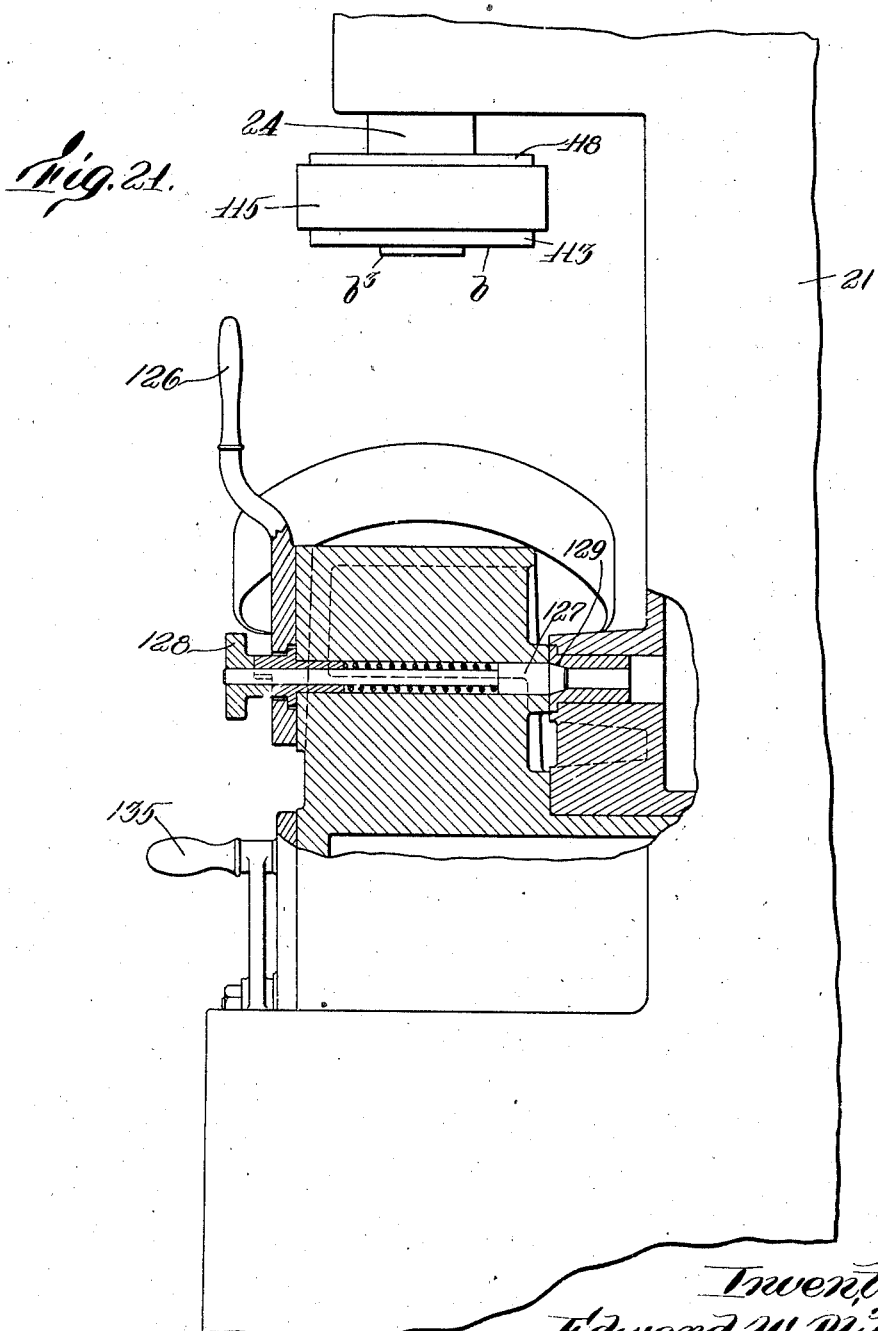

Patented Apr. 10, 1934

1,953,969

UNITED STATES PATENT OFFICE 1,953,969

MACHINE AND METHOD FOR FORMING EXTERNALLY TOOTHED MACHINE ELEMENTS

Edward W. Miller, Springfield, Vt., assignor to The Fellows Gear Shaper Company, Springfield, Vt., a corporation of Vermont Application September 17, 1929, Serial No. 393,291

24 Claims. (Cl. 90—8)

REISSUED

The object of the present invention is to provide a machine and cutter for finishing to final form and dimensions the teeth of spur gears, external clutch elements and other more or less analogous machine elements, all comprehensively included within the generic title of externally toothed machine elements. The operation carried out by the invention consists in cutting all of the teeth simultaneously on one side by a succession of planing cuts performed lengthwise (in the axial direction) of the work piece, with the use of a cutter having a number of cutting elements equal to the number of teeth of the work piece and correspondingly spaced, and provided with cutting edges of a form the counterpart or complement to the desired form of the finished teeth of the work piece; and then simultaneously cutting the opposite sides of all the work piece teeth by a similar series of planing cuts. In the illustrative embodiment here shown the teeth or cutting elements of the tool are symmetrical on opposite sides and the tool is operated with a rotary feed about its axis, first progressively in one direction and then progressively in the opposite direction. However, the invention contemplates and includes a machine and cutter equipped and operable to act thus on one side only of the work piece teeth, leaving the second cutting action to a second, similar but reversed, tool; or to reverse the work piece after its teeth have been cut on one side and repeat the operation on the other side of its teeth by the same tool rotated in the same direction as before.

The specific machine element chosen herein for illustration of the principles of the invention is a spur gear of the involute type, the tooth faces of which are involute curves. This illustration, however, is not a limitation of the invention to the treatment, or means for treatment, of this specific class of machine elements only, but the spur gear typifies all the species of the generic class above defined. In any case, whatever may be the specific machine element, the latter is first rough cut to a more or less near approximation to finished condition, and the finishing tool is then operated to bring it to exact and true condition, forming the work piece teeth to the outline of its own cutting edges.

This invention is one phase (involving the forming of external teeth) of a generic invention, the other phase of which (forming internal teeth) is disclosed in my prior pending application filed February 25, 1928, Serial No. 257,068 for Machine for forming internal clutch elements. All claims generic to both phases of the invention are made in the said prior application. The distinctive features of the present invention comprise a new cutting tool, the combination of such tool with operating means for effecting relative axial reciprocation and rotary feed movements between the tool and the work piece, and alternative means for effecting relief of the cutter from the work during the non-cutting strokes and for bringing the tool and work into and out of operative relationship.

In the drawings,—

Figure 1:
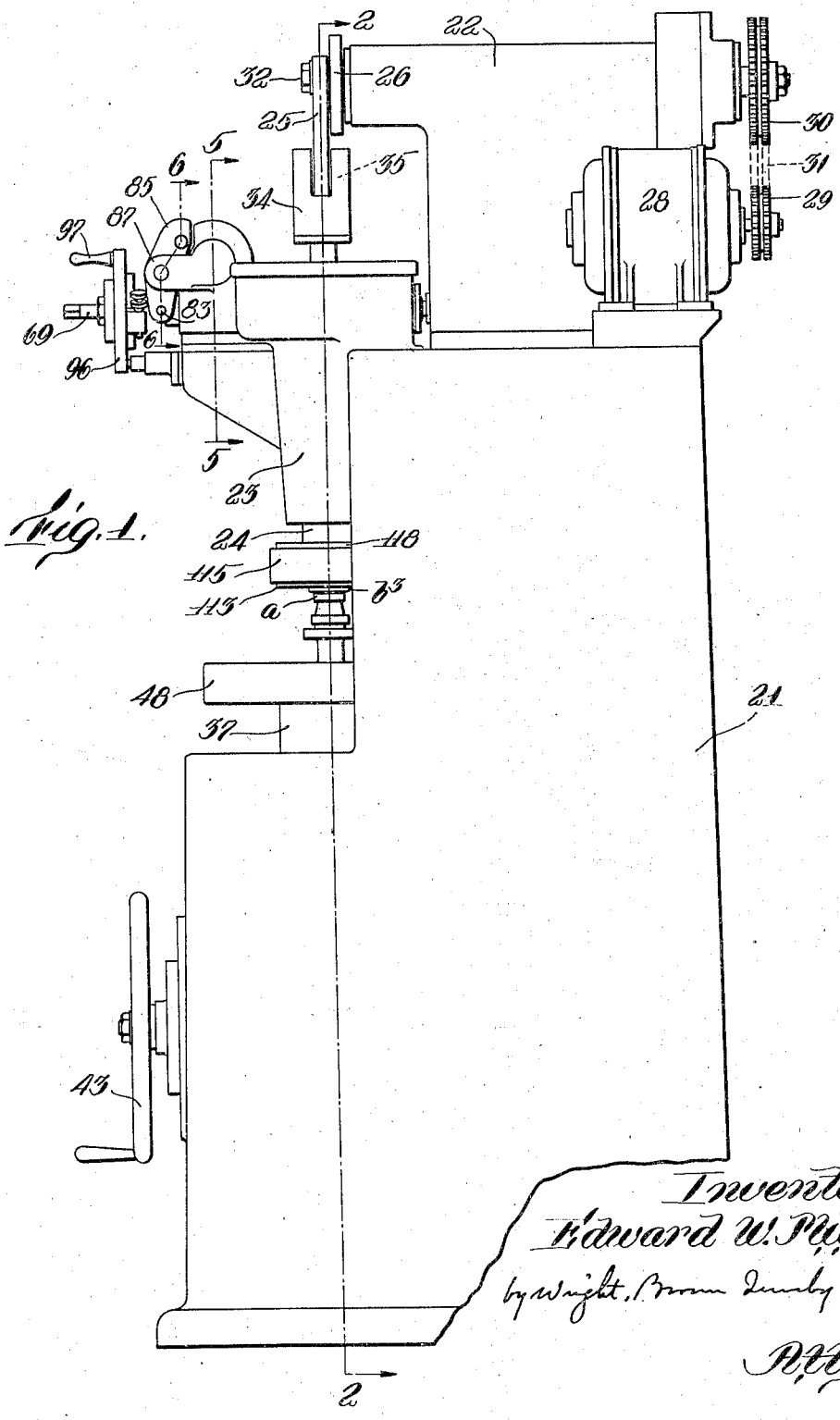
Fig. 1 is a side elevation of a machine embodying the foregoing invention.
Figure 2:
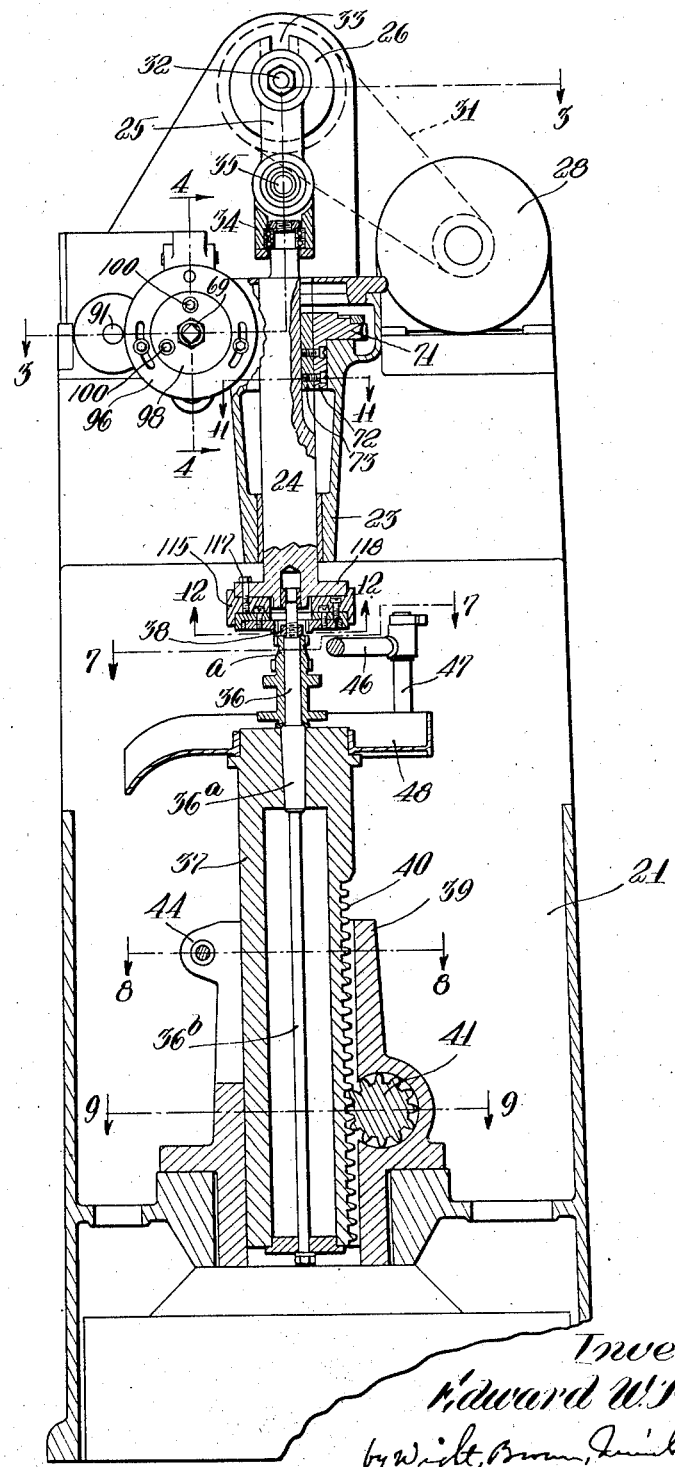
Fig. 2 is a vertical section on line 2—2 of Fig. 1 and an elevation of the parts at the rear of such line.
Figure 3:
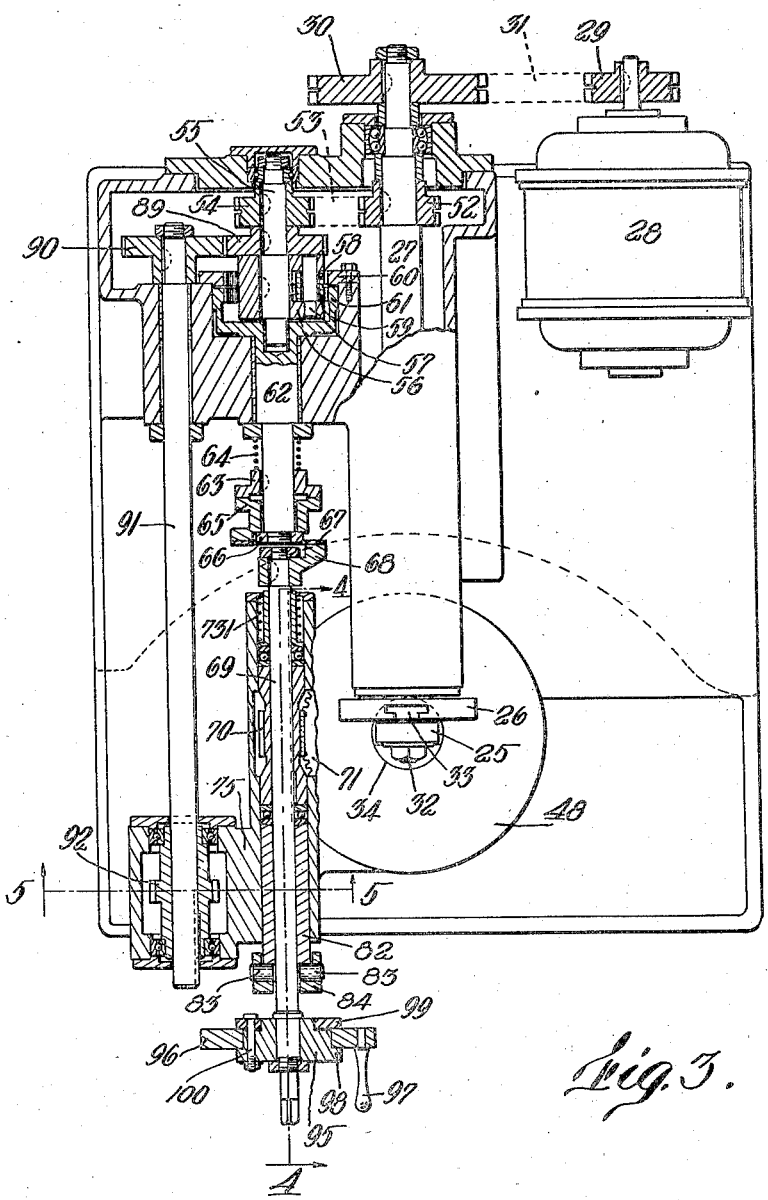
Fig. 3 is a horizontal section and plan view taken on line 3—3 of Fig. 2.
Figure 5:
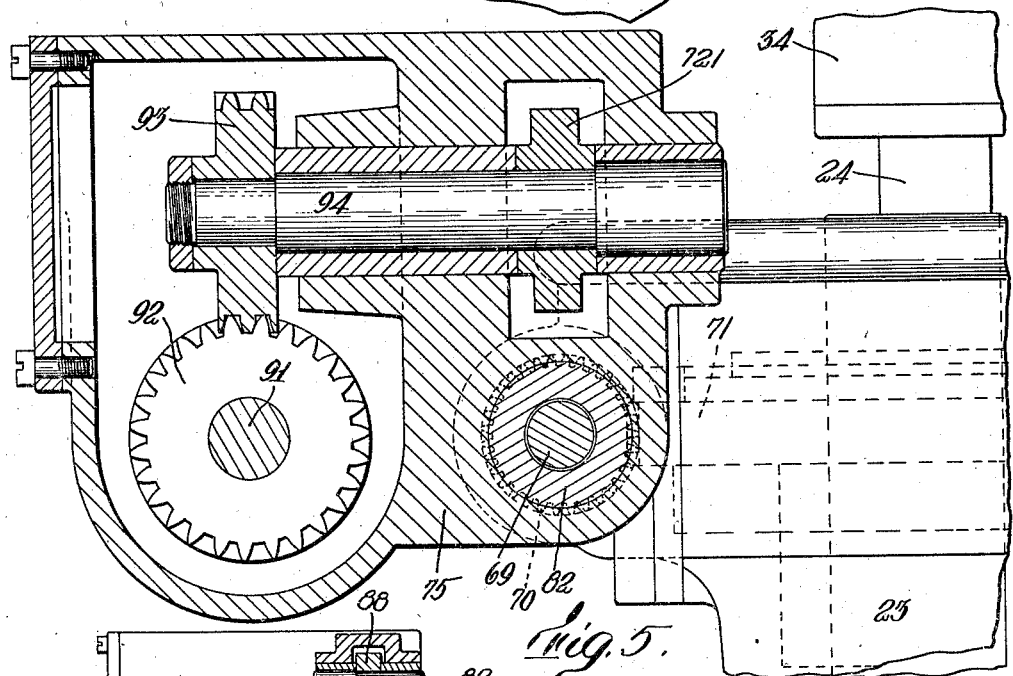
Figure 6:
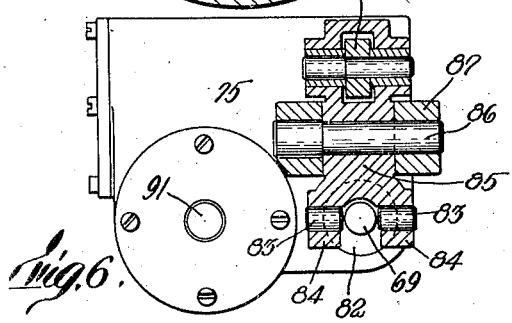
Figure 7:
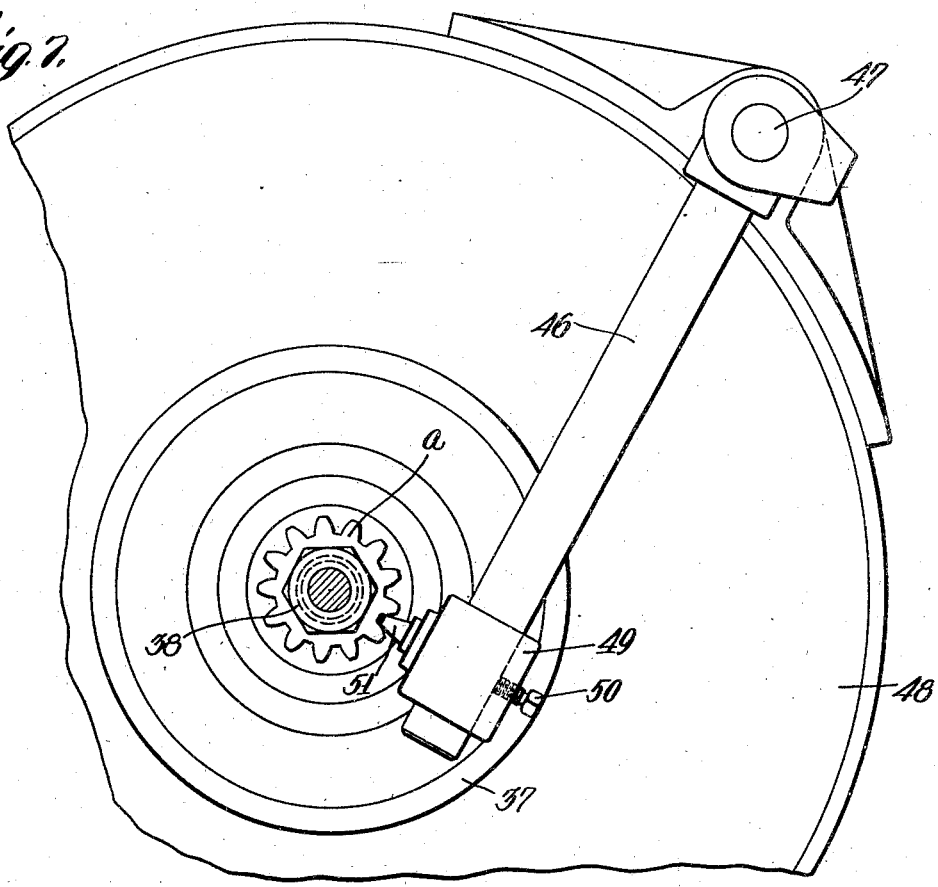
Figure 8:
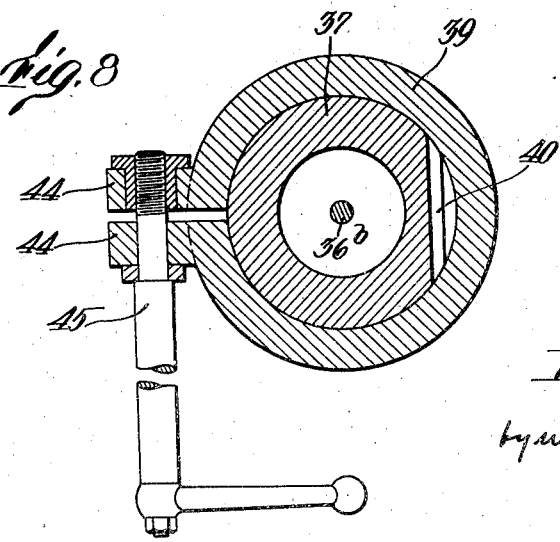
Figure 16:
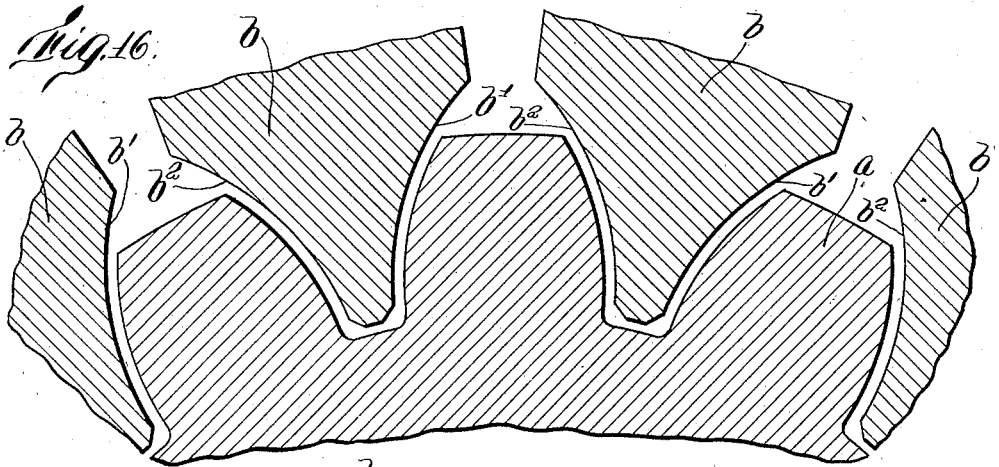
Figure 17:
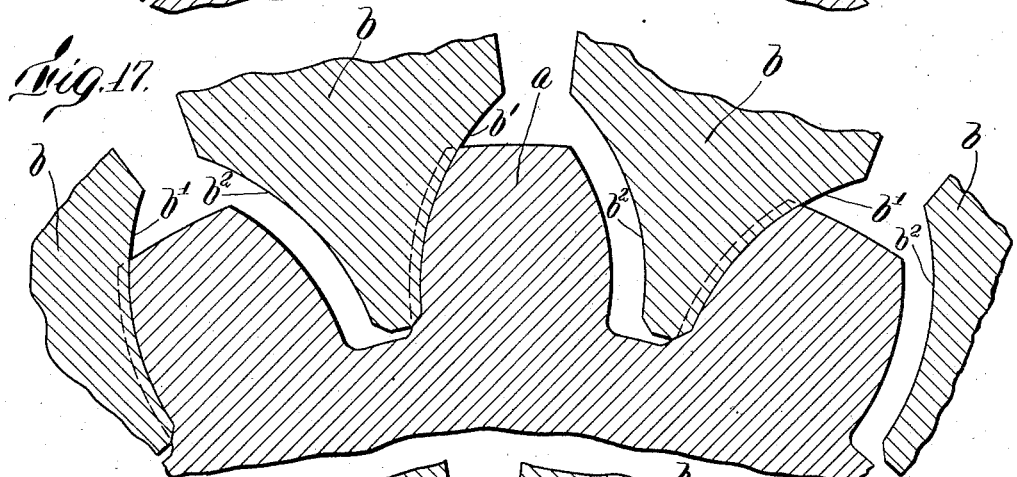
Figure 18:
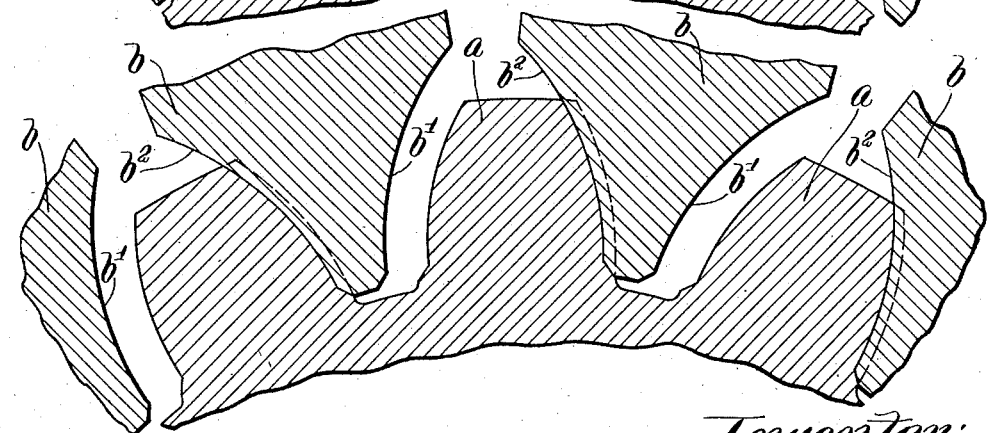
Figure 19:
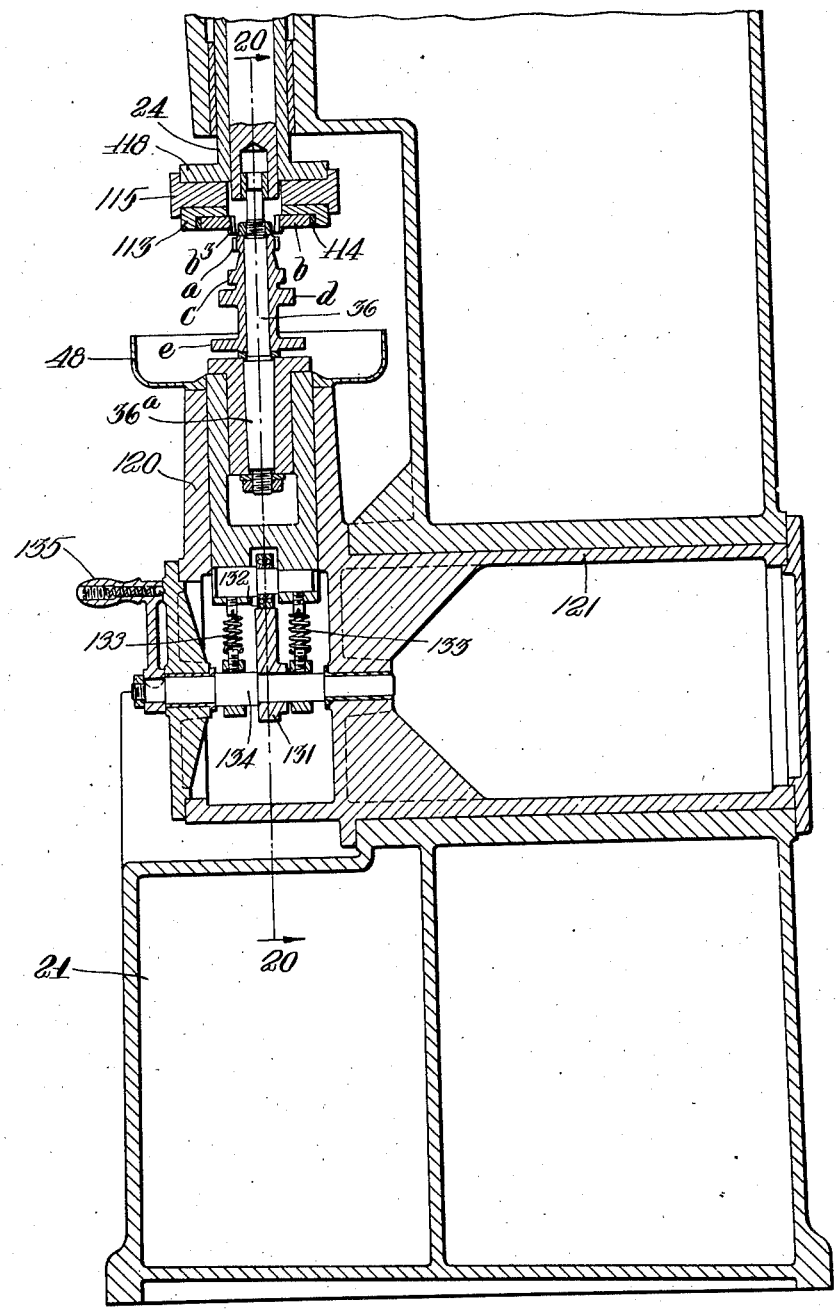

Figs. 5 and 6 are vertical detail sections taken on lines 5—5 and 6—6 respectively of Fig. 1;

Fig. 7 is a fragmentary plan view on an enlarged scale of the work holder and work-alining fixture, the parts immediately below line 7—7 of Fig. 2;

Fig. 8 is a detail cross section taken on line 8—8 of Fig. 2;

Fig. 9 is a detail cross section on line 9—9 of Fig. 2;

Fig. 10 is an elevation of the adjustable cutter feed stop;

Fig. 11 is a cross section on line 11—11 of Fig. 2;

Fig. 12 is an under plan view of the cutter as seen from line 12—12 of Fig. 2 looking upward;

Fig. 13 is a perspective view of one of the blades or unit tools of the cutter;

Figs. 14 and 15 are sectional views illustrating the action of specifically different cutters of the same character on gears of different diameters;

Figs. 16, 17 and 18 are fragmentary enlarged views of the cutter and work in operative relationship;

Fig. 19 is a vertical section showing a form of machine embodying this invention but having a shiftable turret with a number of work pieces;

Fig. 20 is a transverse section on line 20—20 of Fig. 19;

Fig. 21 is a section on line 21—21 of Fig. 20.

Like reference characters designate the same parts wherever they occur in all the figures.

Attention is directed to Figs. 16, 17 and 18 for explanation of the fundamental purpose and accomplishment of the invention. It will be assumed illustratively that the work piece is a spur gear previously cut to an approximation to final dimensions, but having an excess of stock on both sides of its teeth to be removed in a final accurate finishing operation and that the object is to finish it rapidly to final dimensions and form by cutting all its teeth simultaneously. In practice an excess of about ten or twelve thousandths of an inch on each side is suitable for the purpose, but the dimensions of the work piece and cutter and the amount of stock to be removed are not factors of the invention, except that the spaces initially cut in the work piece must be wide enough to admit the teeth or cutting elements of the tool, and the latter must be wide enough for strength. A fragment of such a gear is shown in the above noted figures and designated $a$. For cutting it according to this invention I provide a series of tool units or tool elements $b$ equal in number to the teeth of the gear, having cutting edges $b'$ and $b^2$ at their opposite sides which are counterparts of the forms or curves to be given to the finished gear teeth. Such cutting edges of each tool or cutter element are provided at and adjacent to the extremities of the element and have a relationship to one another like that of the adjacent sides of two contiguous teeth which bound an intermediate space of the gear, except that they are nearer together in order that the tool unit may enter the narrower than standard space of a rough cut unfinished gear. These cutter units are secured to a holder or cutter head and located so that they surround a central open space, and are equidistant from the center of such space and are spaced about a line corresponding to the pitch circle of the gear, equally with the pitch of the gear teeth to be finished. In other words, the cutter units have the same pitch as the gear to be cut and their edges have the same relation to their pitch circle as the sides of the gear teeth to the pitch circle of the gear, except for the narrow formation of the cutter units previously mentioned.

These cutter units are planing cutters having their cutting edges defined by the intersection of their sides with an intermediate face approximately parallel to the plane of the section on which the section of Figs. 16-18 is taken. They are operated by effecting a relative axial reciprocation between the cutter head and the gear after these parts have been brought into the coaxial relationship shown in Fig. 16. At the same time the cutter head and gear are given a progressive relative rotation in one direction between the reciprocative movements until they eventually reach a position somewhat as shown in Fig. 17, when the sides $b'$ of all the cutter units have shaved off the sides of all the gear teeth to the desired depth. Then the direction of relative rotation is reversed and continued until, in the course of their reciprocations, the edges $b^2$ of the cutter units have planed away the opposite sides of the gear teeth to the extent that such teeth have the required finished width.

Describing now the details of an illustrative machine for carrying out these operations, Figs. 1-15 show such a machine equipped with a single work holder. A rigid base or pedestal 21 supports a housing 22 and a guide 23. A cutter spindle or slide 24 is adapted to reciprocate and rotate in the guide 23. It is reciprocated by a connecting rod 25, crank disk 26, shaft 27 and motor 28 which is connected to the shaft by a sprocket drive consisting of sprocket gears 29, 30, and chain 31. The crank pin 32 is adjustable radially of the disk 26 in the guideway 33. The connecting rod is coupled to the cutter spindle by a block 34 in which the wrist pin 35 is mounted and in which the spindle has a rotative and end thrust bearing.

The work piece $a$, which in this instance is the endmost gear element on a gear assemblage of the type used in automobile transmissions, is mounted on a work arbor 36 which has a tapered portion 36$a$ firmly seated in a work carrier 37 by means of a draw rod 36$b$. The work piece is clamped on the arbor by a nut 38. The carrier is fitted slidingly in a guideway 39 and has rack teeth 40 on one side engaging a pinion 41, whereby it is raised to place the work in cutting position and lowered to clear the arbor from the cutter so that the work piece may be placed on and removed from it. Pinion 41 is fast on a shaft 42 (Fig. 9) fitted to a bearing extending through the side of the guide 39, and carrying a hand wheel 43. The guideway is slotted at one side from its upper end downward and provided with ears 44 adapted to be drawn together by a clamp screw 45 (Fig. 8) whereby the carrier is clamped and secured in the working position.

The work piece is positioned angularly by means of an alinement fixture consisting of an arm 46 (Figs. 2 and 7) swiveled on a post 47 which rises from an oil pan 48 fixed on the upper end of the carrier 37. On the arm 46 is a slidable sleeve 49 equipped with a clamping set screw 50 and carrying a finger 51 which is adapted to enter one of the tooth spaces of the work piece. The work piece is thus positioned before its clamping nut is tightened, after which the nut is screwed down and the fixture arm swung aside out of the way of the cutter.

Angular movement is given to the cutter spindle for effecting the rotational feed described with respect to Figs. 17 and 18, by the following mechanism. A sprocket gear 52 fast on shaft 27 drives, by means of a chain 53, a sprocket gear 54 fast on shaft 55. A carrier 56 is likewise made fast to shaft 55 and carries a pivot stud 57 on which is a planet pinion having two steps 58 and 59 having respectively different numbers of teeth. The planet element 58 meshes with a stationary internal gear 60 fastened to a part of the frame, and the other planet element meshes with a rotatable internal gear 61 on a shaft 62. By means of this planetary gearing a very slow speed of rotation is given to the shaft 62. By suitable design of the gear elements 58, 59, 60 and 61, any one of different slow rates of movement within a wide range may be imparted.

One element 63 of a friction clutch is splined on shaft 62 and is pressed by a spring 64 against a complemental clutch element 65 which is free to turn independently of the shaft and is held thereon by a nut 66. A flexible coupling 67 connects the clutch element 66 with an arm 68 keyed to a shaft 69. The coupling here shown is a flat strip of metal screwed to the parts 65 and 68, but this is merely typical of a number of couplings which might be used for the purpose of transmitting rotation from clutch 65 to shaft 69 without requiring exact alinement. A worm 70 is splined on shaft 69 and meshes with a worm wheel 71 which surrounds the cutter spindle 24 and has a hub portion 72 occupying a bearing in the guide or housing 23. A guide member 73 (Figs. 2 and 11) secured to hub 72 and engaging guide faces of well known character associated with the spindle imparts rotation to the latter while permitting unimpeded endwise reciprocation thereof. The guiding means here referred to are of the same character as illustrated in the patent to E. R. Fellows No. 676,227, June 11, 1901, and may be either straight in the direction of the spindle axis, or curved helically about such axis, according to whether the gears being produced are straight or helical. When helical gears are to be produced, the cutter un'ts may be complementally helical.

A slight angular movement is given to the cutter, in the opposite direction to the movement given by the feeding mechanism above described, after each cutting stroke, in order to back off or relieve it during its noncutting return strokes, so that it will not then rub on the work. For this purpose, the worm 70 is splined to shaft 69 and is moved endwise alternately in opposite directions by a cam 721 (Fig. 4) and a spring 731. The spring is a helical one which surrounds a sleeve 74 within the shaft housing 75 and exerts pressure endwise between an abutment 76 on the housing and a shoulder 77 on the sleeve. The sleeve is adapted to slide on the shaft and transmits pressure endwise to the worm through a r'ng 78, with which it has a spherical contact, and a thrust bearing 79. The opposite end of the worm is engaged through an end thrust bearing 80 and a spherical surface ring 81 with a sleeve 82, which is slidable on the shaft 70 and splined within the housing, from which its outer end protrudes. Its protruding end is thus pressed against hardened bearing studs 83 (Fig. 6) mounted in the branches 84 of the forked arm of a lever 85. This lever is pivoted on the pivot shaft 86 held in lugs 87 projecting from the forward end of the housing. Its forked arm straddles shaft 70 and its other arm carries an anti-friction roll 88 which is held continuously, by pressure of the spring 731, in contact with the circumference of the cam.

The cam has a substantially concentric high portion extending through approximately half its circumference and a low portion throughout the balance of its circumference, the difference in height between these portions being small in amount and not necessarily more than enough to sh'ft the cutter through a small fraction of an inch. The cam is rotated at the same angular speed as the cutter driving crank disk 26 (in other words at a one to one ratio) by means of a gear 89 (Fig. 3) keyed to shaft 55 and meshing with gear 90 on a parallel shaft 91, a helical gear 92 also keyed to shaft 91, and a mating helical gear 93 (Fig. 5) on shaft 94 to which the cam is keyed. The mechanism is so timed that, while the rotat'onal feed of the cutter is in the direction indicated by Fig. 17, the high part of the cam is in action during the cutting strokes, holding the cutter elements up to the work, and the low part permits spring 731 to back off the cutter at the end of the cutting strokes and hold it clear of the work during the return strokes. When the direction of feed is reversed in order to dr've the cutter in the direction indicated by Fig. 18, the entire mechanism, including the worm and the cam, is driven in the opposite direction and the low part of the cam then comes into action during the cutting strokes and the high part during the return strokes of the cutter, thus relieving the cutter in the opposite direction to that first described. The spring 731 is a powerful one which exerts force enough to hold the cutter against the work during its cutting strokes.

Reversal of the mechanism to cut the opposite sides of the gear teeth after they have been finished on one side, is accomplished by reversing the direction of running of the driving motor 28. This motor is an electric motor of known character having reversible poles enabling it to run in either direction. As all the mechanisms are driven from this one motor, its reversal causes them all to run reversely. But as the rec'procation of the cutter is accomplished through a crank and connecting rod, reversal of the direction of the crank does not change the reciprocations of the cutter in any particular. A reversible motor for this purpose, however, is not an essential of the invention, since various other driv'ng means of known character may be used with equal effect.

Figure 4:
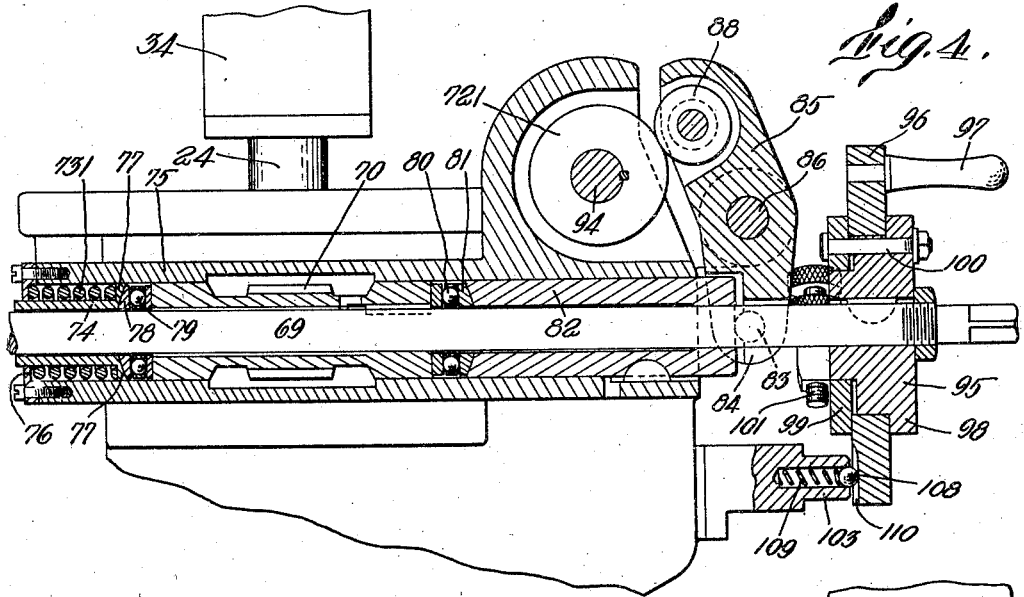
Fig. 4 is a detail vertical section taken on line 4—4 of Fig. 2.

When the cutter has been thus fed rotatably in either direction to a predetermined distance, its movement in this manner is automatically arrested by stops, shown in Figs. 4 and 10. A disk 95 is tightly fitted and keyed to the shaft 69. On this carrier disk is fitted a surrounding annular disk 96 having a handle 97. The annular disk is clamped against a shoulder 98 on the carrier disk by a ring 99, which is arranged and secured by bolts 100 substantially as shown in Fig. 4. This provides a simple means by which the disk 96 may be adjusted angularly about the shaft, and made fast. The disk 96 carries two adjustable stops 101 and 102 (Fig. 10) at respectively opposite sides of a fixed stop 103 which is secured to the frame. Stops 101 and 102 are screws threaded through blocks 104 and 105 respectively, having shanks, one of which passes through a slot 106, and the other through a slot 107, in the disk 96. On the shanks are mounted clamp screws by which the blocks are made fast at any desired points in the respective slots. The slots are concentric with the disk, and each block is made with a concave side fitting against the outer circumference of the clamp ring 99 which is also concentric with the shaft, whereby the blocks are made steady. By movement of the blocks in their slots and by screwing the stop screws forward or back in the blocks, the stop screws may be accurately adjusted within a wide range. When in the course of operation either stop screw reaches the fixed stop, the rotary feed of the cutter is arrested, such arrest being permitted by the friction clutch 63, 65, which then sl.ps and allows the motor to run and continue reciprocating the cutter until stopped by other means. In the machine illustrated the motor is manually stopped and reversed, but automatic means may be provided for doing this. The continued reciprocation of the cutter wh'ch occurs after the rotary feed has been stopped causes the sides of the teeth and the work piece to be smoothed and finished with their elements exactly parallel to the axis of the piece, with removal of the slight helical formation previously given them due to the continuous rotary movement of the cutter while the work piece is held stationary. At most the helical displacement from end to end of the teeth in the work piece is a small proportion of the total amount of rotary feed occurring between cuts.

After the first series of cuts has been completed as shown in Fig. 17, time may be saved in commencing the second series of cuts with rotation of the cutter in the opposite direction, by the operator rotating the worm shaft 69 in the opposite direction by means of the handle 97. A ball check 108 is mounted in a socket in the end of stop 103 and pressed outward by a spring 109 in such socket against the rear face of disk 96. A groove or recess 110 is formed in the disk to receive the ball when the cutter is in neutral position, that shown in Fig. 16, whereby a yielding impediment is given to the rotation of the disk. After completion of the second series of cuts the operator returns the cutter to neutral position. This yielding impediment, in conjunction with the alinement fixture 46 previously described, enables the work pieces and the cutter quickly to be alined correctly before the commencement of operations.

The cutter is a vital factor of the invention. It is shown in detail in Figs. 12-15. It consists of an annular holder or head 111 and a series of cutter units or elements $b$. These units or elements are arranged in the manner of the spokes of a wheel and are first clamped against one face of the holder by screws 112. When they have been correctly located and thus secured, they are additionally and permanently made fast by molten metal, preferably type metal, which is poured into the spaces between and around the cutter elements and within an outer wall or rib 113 which projects from the peripheral part of the head at one side thereof to an extent approximately equal to the thickness of the shank parts of the cutter elements, the spaces between the cutter elements at the rim of the central hole in the cutter head being then temporarily dammed. The type metal is identified in Figs. 14 and 15 by the numeral 114.

While various fusible metals may be used for thus embedding and securing the cutter elements, type metal is preferred because it has a melting point low enough to be used without injuriously heating the cutter elements, and when solid is sufficiently hard and rigid to hold the cutter elements immovable under the stresses to which they are subjected in use. But any other metal or alloy, or nonmetal, having these qualities may be used. A preferred step in this connection is to heat the assembled head and tool elements before pouring in the fusible metal to a temperature high enough to expand the head substantially, although not up to the melting temperature of the fusible metal; say to a temperature between 200° and 300° F. Upon cooling, the shrinkage of the head causes its encircling wall to exert a powerful pressure on the embedding material and thus assure a solid immovable foundation or matrix for the cutter elements.

As previously stated, the inner ends only of the cutter elements have cutting edges. These extremities project over the rim of the central hole in the head and are given greater thickness than the shank portions of the cutter elements, so as to provide stock as shown at $b^3$, protruding beyond the face of the assemblage and which may be ground away on the outer side for sharpening. The intersections of the outer face with the concave sides of the element form the cutting edges $b'$ and $b^2$ first described. Such concave sides are formed with the desired curvature complemental to the prescribed shape of the gear teeth to be finished and are made somewhat sloping to provide the clearance necessary in metal-cutting edged tools.

A given cutter assemblage is adapted to cut gears of the same diameter, pitch and tooth forms. Gears varying in any of these particulars require different cutters. Figs. 14 and 15 show respectively two such cutters, one designed for the gear $a$ at the end of a gear assemblage of the type used in automobile transmissions, and the other for the next gear $c$ of the assemblage. The cutter is connected to the spindle 24 by means of an adapter 115, to which it is secured by screws 116 passing through the adapter into the back of the cutter head, and the adapter in turn is secured by screws 117 to a flange 118 on the end of the spindle. The adapter has a central hole to admit the gear being cut and the nut 38 by which the gear is clamped to the arbor 36. Adapters of different thicknesses are used to accommodate the cutter to gears more or less far removed from the end of the arbor. Thus, for cutting the gear $d$ of the assemblage here shown, a thicker adapter, as well as a cutter having a larger central space than thus shown in Fig. 15, are necessary. When the gear $e$ at the opposite end of the assemblage, which is also the largest gear, is to be cut, the assemblage is turned upside down and applied in the reverse position to that shown in the drawings. For that purpose a cutter substantially larger in diameter is required than the one shown in Fig. 15, and also an adapter correspondingly large at the lower end. Preferably the adapter has flanges protruding to both sides to surround the cutter head and the spindle flange, centering and alining them.

The arbor has an end extension 36c which is guided in a bushing 119 fitted slidingly and adjustable longitudinally in a central recess in the spindle, to maintain the cutter and work in exact alinement, preventing any possible deflection due to the lateral pressure of the rotating cutter against the work.

Figs. 19, 20 and 21 show a different work holder in a machine otherwise the same as hereinbefore described. This work holder consists of a turret 120 having a large and rigid horizontal pivot 121 rotatable in the frame about an axis in the same vertical plane with the work spindle axis, and having two guideways 122 and 123 radial to the pivot in which are slides 124 and 125 carrying work arbors 361 and 362. The turret is movable manually to place either arbor in alinement with the cutter spindle having a handle 126 for so moving it. A spring pressed locking pin 127 having a knob 128 for retracting it (Fig. 21) enters a socket 129 in the frame for securing the turret in the position shown by full lines in Fig. 20; and enters a second socket 130 for locking it in the dotted line position. A cam 131 is engaged by rolls 132 on the slides, the latter being retracted toward the cam by springs 133 (Fig. 19). The cam is mounted on a shaft 134 to which a crank 135 is secured, by which it may be turned manually. With the turret in either position the finished work piece may be removed from the arbor then out of alinement with the cutter spindle, and a blank work piece substituted. This enables the attendant to unload and load the inoperative arbor while the machine is doing its work. In shifting the work holder, the cam is first turned so as to retract the operative arbor, the turret is then swung over from one position to the other, and the cam again turned to raise the arbor which has just been placed in operative position.

The foregoing description has been given as illustrative of the principles of the invention without limiting intent. Evidently various modifications and rearrangements of the parts of the machine without departure from the principles of the invention and within the range of equivalents of the subject matter claimed may be made.

What I claim and desire to secure by Letters Patent is:

1. A machine for finishing externally toothed machine elements comprising a cutter having fixed cutting elements arranged complementally to the teeth of such machine element and having cutting edges which are complemental to the prescribed tooth face outlines but nearer together than the finished width of the spaces to be cut, means for effecting axial reciprocation between said cutter and an alined work piece, and means for effecting a relative rotary feed between the cutter and work piece about their common axis.

2. A machine for cutting to final form simultaneously a plurality of teeth of an externally toothed machine element, comprising a reciprocatable and rotatable cutter spindle, a work holder arranged to hold an unfinished externally toothed machine element in axial alinement with said spindle, means for reciprocating the spindle and rotating it at a slow rate, and a cutter secured to the spindle and having an annular series of rigidly fixed cutting elements narrower than the finished width of the spaces to be cut spaced about the axis of the spindle with the same pitch on a pitch circle of the same diameter as the teeth of the work piece and having cutting edges complemental to the prescribed finished tooth face forms.

3. A machine for cutting to final form simultaneously a number of teeth of one and the same machine element, comprising a series of cutting elements located in fixed relation to one another conformably to the tooth spaces of an unfinished roughed out gear and narrow enough to enter such spaces, each having on one side a cutting edge complemental to the prescribed finished curvature of the gear teeth, and means for effecting relative reciprocative cutting movement and rotative feed movement between said cutting elements and an unfinished gear located in alinement with the axis of said series.

4. A machine for forming the teeth of externally toothed machine elements, comprising a cutter having a central opening and a series of cutting elements protruding inwardly toward its axis from the rim of such opening, said cutting elements being provided with cutting edges of prescribed form, nearer together than the finished width of the spaces to be cut, and being spaced equidistantly and at an invariable distance from said axis with a pitch equal to the pitch of the teeth in the work piece, means for holding said cutter and an externally toothed machine element in axial alinement, and means for effecting relative movements of axial reciprocation and rotation between the cutter and work piece.

5. A machine for shaping the teeth of externally toothed gear elements comprising a work holder, a cutter spindle axially alined with the work holder when in operation, a cutter mounted on said spindle having a central opening adapted to receive the work piece, and cutter elements extending inwardly to an invariable distance from the rim of such opening with lateral cutting edges complemental to the form to be given the sides of the teeth of the work piece, said elements being narrower than the tooth spaces of the finished work piece whereby they are able to enter the spaces between the teeth of a rough cut unfinished work piece, means for reciprocating the cutter spindle, means for progressively rotating said spindle in one direction, and means for giving a limited additional oscillation to the spindle oppositely to the direction of such progressive rotation after each cutting stroke, and in the same direction as the progressive rotation after each return stroke.

6. A machine for shaping the teeth of externally toothed gear elements comprising a work holder, a cutter spindle axially alined with the work holder when in operation, a cutter mounted on said spindle having a central opening adapted to receive the work piece, and cutter elements extending inwardly from the rim of such opening with lateral cutting edges complemental to the form to be given the sides of the teeth of the work piece, said elements being narrower than the tooth spaces of the finished work piece whereby they are able to enter the spaces between the teeth of a rough cut unfinished work piece, means for reciprocating the cutter spindle, and means for progressively rotating said spindle in one direction, said rotation-causing means being reversible to cause action of the cutter elements on the opposite side of the work piece teeth after completion of a series of cuts over one side thereof.

7. A machine for shaping the teeth of externally toothed gear elements comprising a work holder, a cutter spindle axially alined with the work holder when in operation, a cutter mounted on said spindle having a central opening adapted to receive the work piece, and cutter elements extending inwardly from the rim of such opening with lateral cutting edges complemental to the form to be given the sides of the teeth of the work piece, said elements being narrower than the tooth spaces of the finished work piece whereby they are able to enter the spaces between the teeth of a rough cut unfinished work piece, means for reciprocating the cutter spindle, means for progressively rotating said spindle in one direction, said rotation-causing means being reversible to cause action of the cutter elements on the opposite side of the work piece teeth after completion of a series of cuts over one side thereof, and means for additionally oscillating the cutter spindle after each reciprocation thereof in such manner that, with rotary feed in either direction, the cutter elements are moved clear of the work piece during each return stroke of the spindle and held in cutting engagement with the work piece during each cutting stroke of the spindle.

8. A machine for shaping the teeth of externally toothed gear elements, comprising a work holder, a cutter spindle axially alined with the work holder when in operation, a cutter mounted on said spindle having a central opening adapted to receive the work piece, and cutter elements extending inwardly from the rim of such opening with lateral cutting edges complemental to the form to be given the sides of the teeth of the work piece, said elements being narrower than the tooth spaces of the finished work piece whereby they are able to enter the spaces between the teeth of a rough cut unfinished work piece, means for reciprocating the cutter spindle, means for progressively rotating said spindle in one direction, a worm gear coupled to the spindle for imparting rotation thereto, a worm meshing with said gear for rotating it, and means for moving the worm endwise alternately in opposite directions in such timing with the reciprocative strokes of the spindle that an increment of rotation is given to the spindle oppositely to the rotary feed after each cutting stroke and in the same direction as the rotary feed after each return stroke.

9. A machine for forming simultaneously a plurality of teeth in a previously partially completed machine element having external teeth, comprising a stationary work holder, a reciprocative and rotatable cutter spindle, a cutter carried on the end of said spindle having fixed cutting elements surrounding a central space and extending inwardly from the boundary of such space, said cutting elements being equal in number and correspondingly spaced to the spaces between the teeth of the work piece and having cutting edges which are complemental to the prescribed finished forms of the tooth faces in the work piece, means for reciprocating said spindle, and means for rotating the spindle comprising a worm gear having rotation transmitting and reciprocating permitting engagement with the spindle, a worm meshing with said gear, and a driving shaft for said worm.

10. A machine for forming simultaneously a plurality of teeth in a previously partially completed machine element having external teeth, comprising a stationary work holder, a reciprocative and rotatable cutter spindle, a cutter carried on the end of said spindle having external cutting elements surrounding a central space, said cutting elements being equal in number and correspondingly spaced to the spaces between the teeth of the work piece and having cutting edges which are complemental to the prescribed finished forms of the tooth faces in the work piece, means for reciprocating said spindle, and means for rotating the spindle comprising a worm gear having rotation transmitting and reciprocation permitting engagement with the spindle, a worm meshing with said gear, and a driving shaft for said worm, the worm being splined on its driving shaft whereby it is rotated thereby and free to move endwise thereon, combined with a spring exerting endwise pressure in one direction on the worm, and a cam and intermediate lever organized to exert endwise pressure in the opposite direction on the worm, the cam being so timed with respect to the reciprocations of the spindle that it cooperates with the spring in giving endwise movements to the worm such as to relieve the cutting elements from the teeth of the work piece during noncutting strokes of the cutter and return the cutter into cutting position for the cutting strokes thereof.

11. A machine for forming simultaneously a plurality of teeth in a previously partially completed machine element having external teeth, comprising a stationary work holder, a reciprocative and rotatable cutter spindle, a cutter carried on the end of said spindle having external cutting elements surrounding a central space, said cutting elements being equal in number and correspondingly spaced to the spaces between the teeth of the work piece and having cutting edges which are complemental to the prescribed finished forms of the tooth faces in the work piece, means for reciprocating said spindle, means for rotating the spindle comprising a worm gear having rotation transmitting and reciprocating permitting engagement with the spindle, a worm meshing with said gear, a driving shaft for said worm, a friction clutch imparting driving rotation to said shaft, and a positive stop for arresting the rotation of the worm when the rotary feed of the cutter has continued to a predetermined extent.

12. In a machine of the character described, a reciprocatable and rotatable cutter spindle, a block having rotatable and end thrust engagement with the spindle, a driving crank, a connecting rod between said crank and block having a wrist connection with the latter, and means for imparting a progressive rotative feed movement to the spindle simultaneously with the reciprocative movements thereof.

13. A machine of the character described, comprising a shaft, a reciprocative and rotatable cutter spindle, means driven by said shaft for reciprocating the spindle, a worm driving shaft, a planetary gearing driven by the first named shaft and organized to transmit slow rotation to the worm driving shaft, a worm on the last named shaft, a worm wheel meshing with said worm and engaged with the spindle to impart rotation to the latter, a friction clutch interposed between the planetary gearing and the worm driving shaft, and a positive stop for arresting rotation of the worm driving shaft at a predetermined limit.

14. A machine of the character described, comprising a shaft, a reciprocative and rotatable cutter spindle, means driven by said shaft for reciprocating the spindle, a worm driving shaft, a planetary gearing driven by the first named shaft and organized to transmit slow rotation to the worm driving shaft, a worm on the last named shaft, a worm wheel meshing with said worm and engaged with the spindle to impart rotation to the latter, a friction clutch interposed between the planetary gearing and the worm driving shaft, the worm and its driving shaft having a splined connection whereby endwise movement of the worm on the shaft is permitted, a counter shaft driven from the first named driving shaft, a cam driven from said counter shaft, a lever engaged with said cam and having an arm arranged to exert pressure endwise against the worm, and a spring exerting pressure endwise in the opposite direction against the worm.

15. In a machine for finishing gears and the like by a forming cutter having circularly arranged cutting elements adapted to operate simultaneously on a plurality of teeth of the work piece, a reciprocative and rotatable spindle on which the cutter is secured, a work holder in axial alinement with said spindle, and means for moving said work holder back and forth along the axis of the spindle for placing the work piece in and out of operating relationship with the cutter.

16. A machine for shaping and finishing spur gears comprising a normally stationary work holding arbor, a cutter spindle arranged to reciprocate and rotate in and around an axis in alinement with said arbor, and separated therefrom, means independent of the arbor for guiding said spindle, a cutter mounted on the end part of said spindle near the arbor and having cutting elements surrounding said axis with their extremities directed toward the axis, said elements provided with cutting edges at and adjacent to such extremities which are complemental to the prescribed finished tooth faces of the work piece, said arbor having a guiding extension projecting into the spindle and in guided engagement therewith to prevent displacement of the work piece.

17. A machine of the character described comprising an alined cutter spindle and work arbor, means for reciprocating said cutter spindle in, and rotating it about, its axis, and a cutter secured to said spindle having cutting elements with cutting edges on corresponding sides which are a counterpart formation to the prescribed finished form of the teeth of a given externally toothed machine element, said cutting elements being arranged to project toward the axis of the cutter from a coaxial circular line with an angular spacing on such line equal to the spacing on a circle of the same diameter between corresponding faces of adjacent teeth of the machine element.

18. The method of forming an externally toothed machine element which consists in providing a cutter having cutting elements surrounding an open interior space and arranged with spaces between them opening into such interior space and arranged correspondingly to the teeth of such toothed machine element, placing the cutter and a work piece in axial alinement, and effecting an axial reciprocation between the cutter and work piece, together with a rotation of one relatively to the other about their common axis, in such manner that all of the cutter elements are caused to act simultaneously on the work and form one side of each of the teeth of the work piece by a planing action.

19. The method as set forth in claim 18, including further the step of reversing such relative rotation and causing the cutter similarly to form the opposite sides of such teeth.

20. The method of forming an externally toothed machine element which consists in providing a cutter having cutting elements surrounding an open interior space and projecting inwardly toward the center of such space, and arranged, as to their radial and angular relation to the center of such space, in exact conformity with the spaces to be cut in the work, placing the cutter and work piece in axial alinement, and effecting a relative axial reciprocation between the cutter and work piece together with a slow angular rotation progressively in the same direction of one relatively to the other about their common axis, in such manner that all of the cutter elements are caused to act simultaneously on the work and form one side only of each of the teeth of the work piece by a succession of planing strokes.

21. The method as set forth in claim 20 comprising further the step of reversing such relative rotation and causing the cutter elements similarly to form the opposite sides of the work piece teeth by a succession of planing cuts performed successively in the opposite direction.

22. In a machine for finishing gears and the like by a forming cutter having circularly arranged cutting elements adapted to operate simultaneously on a plurality of teeth of the work piece, a spindle on which the cutter is secured, a work holder in axial alinement with said spindle, means for moving the spindle axially and repeatedly through a distance sufficient for planing off the sides of the teeth of the work piece, and means for moving said work holder back and forth along the axis of the spindle through a distance greater than the length of the reciprocative movements of the cutter.

23. In a machine for finishing gears and the like by a forming cutter having circularly arranged cutting elements adapted to operate simultaneously on a plurality of teeth on the work piece, a spindle on which the cutter is secured, means for reciprocating the cutter axially through a limited distance for acting on the work piece in a succession of cutting strokes, a work spindle in axial alinement with the cutter, a guide located at a distance from the end of said spindle in which said work holder has endwise sliding movement, means for moving the work spindle endwise in said guide, and clamping means for securing the work holder in positions more or less remote from the end of the cutter spindle.

24. In a machine as set forth in claim 23, the combination of a work holding arbor secured to said work holder and extending thence into guided sliding engagement with the spindle.

EDWARD W. MILLER.